2,888,715
PROPORTIONAL PRESSING

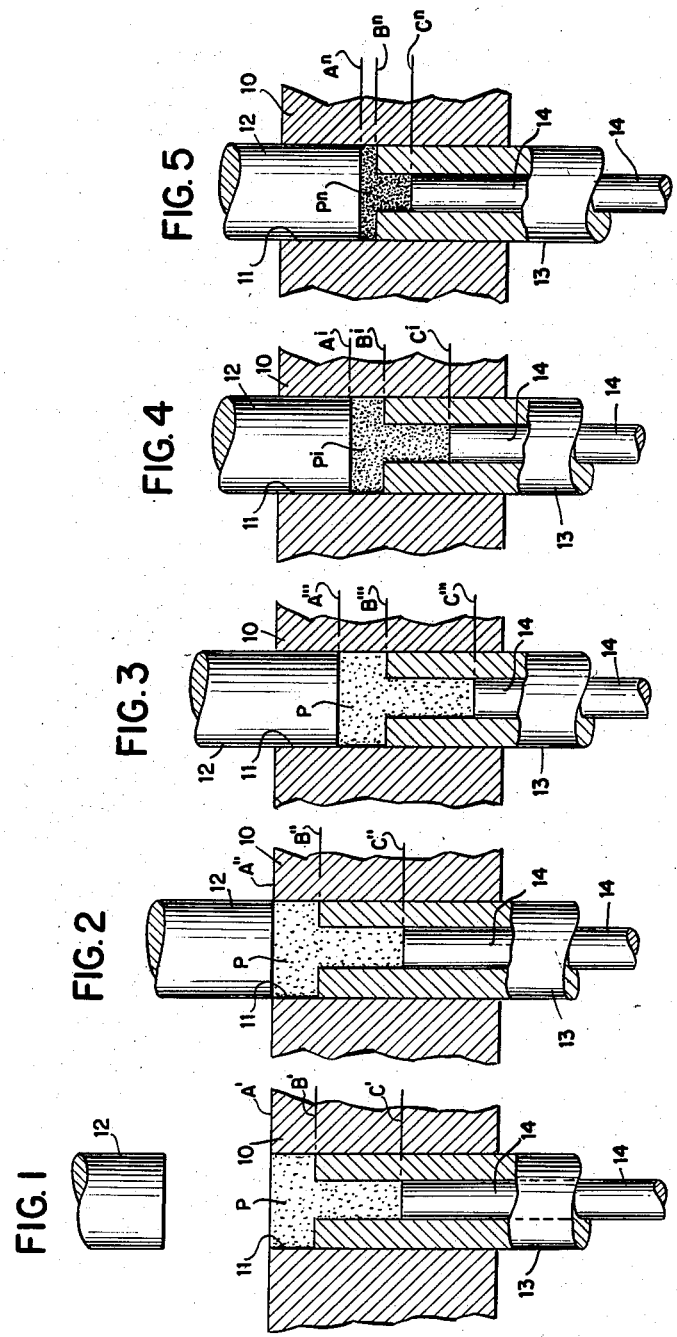

Raymond G. Frank, Ambler, Pa., assignor to F. J. Stokes Corporation, Philadelphia, Pa., a corporation of Pennsylvania Application March 21, 1957, Serial No. 647,604

2 Claims. (Cl. 18—59.3)

This invention relates to molding articles from particulate materials and, in particular, provides a method of forming molded articles having complicated, stepped shapes wherein two or more punches are advanced into a die from one end of the die to compact particulate material to different levels in the die.

It has heretofore been recognized that certain materials, such as powder metals, ceramics and carbon, can be compacted to shape under application of suitable pressures, even though such materials are neither plastic nor readily fluent at higher pressures employed. Such lack of plasticity and fluency has, however, hampered production of complicated shapes since the compact material cannot be made to flow easily and thus conform to the shape of a mold. A smooth bore die, consequently, is conventionally employed, and several punches are advanced into the die to compress the compact to different ultimate levels in order to impart the requisite shape to the desired article.

A difficulty with this method of manufacture of molded parts stems from the fact that as each punch advances into the die against the powder charge there is an initial tendency for the fill in the path of one punch to move into the path of another, unevenly distributing the material in the compact. At higher molding pressures the compact material ceases to be fluent and further transfer of material in the compact from the path of one punch to the path of another does not readily occur. As a consequence the various punches tend to compress their respective powder columns in different degrees thereby producing a finished article having non-uniform density. Such an article can be so weakened as to render it unfit for its intended use, and where the article is to be sintered it can develop cracks and fissures. These difficulties are aggravated by the fact that transfer of compact material from one powder column to another during initial movement of the punches is unpredictable and, therefore, no great benefit is obtained by preselecting the operating variables. It is not possible to predetermine the exact initial fill in each powder column which is required to achieve uniform final compact density at the end of the compression stroke.

It is a primary object of this invention to provide a method for molding particulate materials in which the above noted difficulties are avoided.

In particular my invention contemplates driving the several punches advanced into a die such that, after completely repositioning the powder charge in the die cavity to fill voids under the upper punch or punches, if necessary, without compressing the powder, the absolute sum of the length of stroke from the beginning of compression to any instant during the compression cycle of any punch plus that of the directly opposing punch or portions thereof is proportional to the corresponding absolute sum of the length of stroke of any other punch plus that of its directly opposing punch or portions thereof at the same instant in the cycle in the same ratio as the final dimensions of the finished article to be formed at the end of the stroke between the respective punches. Furthermore, the initial fills of free powder over each lower punch are in direct proportion to one another in the same ratios as the final dimensions of the finished part to be formed over the respective punches permitting, then, the accurate preselection of fill depths. In addition, at any instant during the compression cycle, the powder column height between any set of opposing punches is in the same proportion to the initial depth of fill and to the final dimensions of the finished part to be formed between the said punches, such that the instantaneous internal molding pressures (p.s.i.) of the compact being formed, and hence, the density throughout the compact is essentially uniform. Finally, the ratio of instantaneous absolute velocity of any two punches entering the die from the same end is in the same proportion as the ratio of complete strokes necessary to fully compact the finished article over said punches. For convenience, the method of invention can thus be designated "proportional pressing."

These and other objects of the invention are more fully illustrated by reference to the appended drawings in which:

Figure 1 is a schematic representation of a die after it has been filled with particulate molding material;

Figure 2 is a similar view of the same die at the point of upper punch entrance;

Figure 3 is a similar view of the same die after the upper and lower punches have been floated downwardly together to position the powder charge in the die prior to pressing to preclude possibility of "puffing" powder when the upper punch enters the die;

Figure 4 is a similar view illustrating the relative positions of the punches at any intermediate point during pressing; and Figure 5 is a similar view at which the punches have moved to their ultimate levels to compress the compact to a solid, stepped article.

In the drawings the reference numeral 10 represents a die table having a vertical, smooth bore, die 11 formed therein. An upper punch 12 is mounted above die table 10 for reciprocal movement vertically into die 11. A pair of coaxially mounted sleeve 13 and core 14 lower punches are similarly mounted for vertically reciprocal movement upwardly in die 11. In the illustrated arrangement it is desired to form a cylindrical article having at one end a horizontally extending annular flange of thickness AB and having an overall body height of AC.

Referring to Figure 1 lower punches 13 and 14 are accordingly dropped in die 11 to form a volume in die 11 above them, receiving the exact quantity of powder charge P required to form the ultimately molded object. Core punch 14 and sleeve punch at this time are positioned in die 11 below the level of table 10 such that the vertical distance A'B' from the level of table 11 to the upper surface of sleeve punch 13 and the vertical distance A'C' from the level of table 11 to the upper surface of core 14 are in the same ratio as the flange thickness AB and body thickness AC of the finished article.

Referring to Figure 2, upper punch 12 is then advanced down to the level of die table 10 and the top of powder charge P. At this point no compaction has taken place and powder charge P lies in die 11 covered at its upper end by punch 12 and supported from beneath by sleeve punch 13 and core punch 14. The distance A"B" between the undersurface of punch 12 and the upper surface of sleeve 13 is thus equal to A'B', and similarly the distance A"C" from the undersurface of punch 12 to the upper surface of punch 14 equals A'C'.

Referring next to Figure 3, upper punch 12 and lower punches 13 and 14 are simultaneously floated down in die 11 without relative movement between any of the punches to position powder charge P for pressing. At this point no compaction has occurred. The distance $A'''B'''$ corresponding to $A''B''$ in Figure 2 remains equal to $A''B''$ and $A'''C'''$ corresponding to $A''C''$ equals $A''C''$.

The punches are all then moved to compact powder charge P to its ultimate dimensions shown in Figure 5, punch 12 advancing downwardly with its undersurface moving from horizontal plane $A'''$ to horizontal plane $A^n$, sleeve punch 13 advancing upwardly with its upper surface moving from horizontal plane $B'''$ to horizontal plane $B^n$, and core punch 14 advancing upwardly with its upper surface moving from horizontal plane $C'''$ to horizontal plane $C^n$, such that the vertical distances $A'''B'''$ and $A^nB^n$ are in the same proportion as the vertical distances $A'''C'''$ and $A^nC^n$. The vertical distances $A^nB^n$ and $A^nC^n$ are of course equal, respectively, to the dimensions AB and AC of the desired article. The reference letter $P^n$ designates the finally compacted powder charge.

The movement of the punches during compression is controlled at all times, at least for so long as powder charge is fluent, such that the vertical spacings between any intermediate horizontal plane $A^1$ in which the undersurface of punch 12 lies, the corresponding intermediate horizontal plane $B^1$ in which the upper surface of punch 13 lies and the corresponding intermediate horizontal plane $C^1$ in which the upper surface of punch 14 lies are in constant proportions. Thus the ratio of $A^1B^1$ to $A^1C^1$ equals the ratio of $A^nB^n$ to $A^nC^n$, as is show in Figure 4 which represents the relative positions of the punches at any intermediate position during such compression. The powder charge in its partially compacted form is designated by the reference letter $P^1$.

When punches 12, 13 and 14 have thus been each advanced into die 11 to the final dimensions of the article to be formed ejection of the compacted article $P^n$ is accomplished in a conventional manner by raising, first, upper punch 12 and then, without relative movement between them, lower punches 13 and 14, until the upper surface of punch 13 is level with the surface of die table 10 at which point punch 13 stops. Thereafter punch 14 continues to move the compact upwardly from within punch 13 until the upper surface of punch 14 is level with the upper surface of punch 13 and die table 10 to complete the ejection.

While the invention has been described in an arrangement in which constant ratios of depth of fill is maintained throughout compression, it will be evident from the above discussion of the fluency of powdered molding materials such as metals, ceramics and carbon that such constant ratios of depth of fill need be maintained only during the initial stages of compression during which the forces applied to the punches may represent only 10 or 15% of the total forces which must be applied, since at higher molding pressures transfer of the powder charge from the path of one punch to the path of the other does not occur. The total relative strokes, however, must be proportioned to the dimensions of the finished article in all cases.

The preceding description of proportional pressing has been described with reference to a pressing operation involving what is sometimes known as resistance pressing. There are generally three basic methods of pressing involving opposing punches which are commonly employed. In each of these methods a powder charge is loaded to the level of a die table in a die above one or more lower punches supported with their upper ends in the die.

In one such method, straight pressing, the upper punch is thereafter lowered to the level of the powder charge and die table without movement of the lower punch or punches. Thereafter the upper and lower punches are each advanced toward each other to compress the powder charge to its final dimensions.

In resistance pressing, a second such method and illustrated with reference to the above drawings, the upper punch is first dropped to the level of the die table and powder charge without movement of the lower punch or punches. Thereafter, the powder charge is floated downward in the die without compaction by the upper punch resisted by extremely light force on the lower punch or punches, maintaining the fixed fill relationship between the lower punches during this downward movement until such time as the opposing punches are advanced toward each other in the die to compact the powder charge. The resisting force on the lower punches is controllable such that the punches can be floated downward without compaction or with controlled compaction that is insufficient to transfer powder from one column to another but permits repositioning of powder in die to fill voids in the upper punch, if existent, prior to final compaction.

In the third method, underfill pressing, prior to the upper punch entrance the powder charge in the die is lowered by dropping the lower punch or punches. To accomplish this the lower punches can be lowered individually, together to different levels, without relative movement between them or other combinations. Thereafter, the upper punch is advanced into the die to the level of the powder charge without movement of the lower punch or punches and finally the opposing punches are advanced toward each other in the die to compact the powder charge.

While the preceding description of the invention has been specific to an instance employing resistance pressing, it will be apparent that straight pressing and underfill pressing methods as well as other pressing arrangements can readily be employed in the practice of the invention, since the variations of these methods lie in the adjustment of the powder charge before compression whereas the present invention is concerned only with the method by which compression is accomplished.

It will also be evident to those skilled in the art that proportional pressing of the invention can be accomplished employing conventional presses. If each of the punches is independently actuated by an interconnected set of rotated cams, the cams can readily be cut with profiles suitable for achieving proportional pressing. Similarly if each of the punches is actuated by a separate hydraulic cylinder from a common oil reservoir and the areas of the pistons in the cylinders are arranged to correspond to the areas of the various punches controlled thereby, proportional pressing will be achieved, provided fill stops and entrance stops are appropriately set up to provide proportional stroke lengths. It is preferred, however, particularly in the case of low tonnage presses to employ the proportionating cylinders of copending application Serial No. 647,639 filed March 21, 1957, by Raymond G. Frank.

It will also be evident that the invention is not limited to instances where a plurality of punches advances from beneath a powder charge, but that a plurality of punches can be advanced from any direction into a die consistent with filling the die and ejecting the desired article.

I claim:

1. In a method of compressing particulate materials in a smooth bore die by advancing into said die from an end thereof a plurality of punches to different ultimate levels to compress said particulate material in said die to form a stepped, solid article, the improvement which comprises advancing said plurality of punches to compress said material in said die from a point prior to compaction of said material and at which said punches are disposed relative one to another such that the depth of fill of said material in said die in front of each said punch is in the same proportion to the depth of fill in front of each other said punch as are the corresponding thickness of said stepped article to be formed, and holding constant such proportionate depth of fill in front of each punch while they are advanced to compress said material by maintaining the ratio of instantaneous absolute velocities of said punches in the same proportion as the ratio of complete strokes of said punches to said ultimate levels.

2. In a method of compressing particulate materials in a smooth bore die by advancing into said die from an end thereof a plurality of punches to different ultimate levels to compress said particulate material in said die to form a stepped, solid article, the improvement which comprises advancing said plurality of punches to compress said material in said die from a point prior to compaction of said material and at which said punches are disposed relative one to another such that the depth of fill of said material in said die in front of each said punch is in the same proportion to the depth of fill in front of each other said punch as are the corresponding thickness of said stepped article to be formed, and holding constant such proportionate depth of fill in front of each punch while they are advanced to compress said material by maintaining the ratio of instantaneous absolute velocities of said punches in the same proportion as the ratio of complete strokes of said punches to said ultimate levels until said material is no longer fluent in said die.

References Cited in the file of this patent

UNITED STATES PATENTS 2,562,876  Baeza _____ Aug. 7, 1951

FOREIGN PATENTS 610,011  Great Britain _____ Oct. 11, 1948